United States Patent [19]
Bell

[11] Patent Number: 5,670,779
[45] Date of Patent: Sep. 23, 1997

[54] ELECTRO-OPTICAL SHAFT ANGLE TRANSDUCER HAVING A ROTATABLE REFRACTIVE OPTICAL ELEMENT

[75] Inventor: Bill Bell, Brookline, Mass.

[73] Assignee: General Scanning, Watertown, Mass.

[21] Appl. No.: 435,319

[22] Filed: May 5, 1995

[51] Int. Cl.$^6$ ..................................................... G01D 5/34
[52] U.S. Cl. .......................... 250/231.13; 250/231.16; 250/234
[58] Field of Search ............... 250/231.13, 214 PR, 250/231.14, 231.18, 231.15, 231.16, 237 G, 237 R, 235, 236

[56] References Cited

U.S. PATENT DOCUMENTS

| | | | |
|---|---|---|---|
| 3,828,188 | 8/1974 | Matula | 250/231.13 |
| 3,940,609 | 2/1976 | Johnstun | 250/231.13 |
| 4,056,722 | 11/1977 | Ray | 250/231.13 |
| 4,184,072 | 1/1980 | Standford et al. | 250/231.13 |
| 4,882,490 | 11/1989 | Takasaki et al. | 250/236 |
| 5,018,808 | 5/1991 | Meyers et al. | 250/235 |
| 5,187,541 | 2/1993 | Task | 356/239 |
| 5,268,746 | 12/1993 | Masetti et al. | 356/432 |

FOREIGN PATENT DOCUMENTS

| | | |
|---|---|---|
| 2 626 972 | 2/1988 | France. |

OTHER PUBLICATIONS

Killeen, T.L. et al., "Parallelism maps for optically contacted etalons", Applied Optics, vol. 20, No. 15, 1 Aug. 1981, pp. 2616–2619.

R.A. Buchroeder et al., Rotating Prism Compensators, Part I: Theory, 86 SMPTE Journal, 431–438 (Jun., 1977).

William L. Wolfe and George J. Zissis, The Infrared Handbook, pp. (10–50)–(10–54).

Joseph S. Accetta and David L. Shumaker, The Infrared and Electro-Optical System Handbook, pp. 135–136, (Jan. 1993).

3 R.V. Jones, Instruments and Experiences, pp. 55–62 (May, 1988).

Primary Examiner—Que Le
Attorney, Agent, or Firm—Cesari and McKenna, LLP

[57] ABSTRACT

A shaft angle transducer uses a rectangular prism to refract a light beam in proportion to the angular displacement of a shaft and then measures the refraction with a pair of light sensors. A fixed light source projects a light beam through a cylindrical lens and the prism to produce a patch of light on the fixed light sensors. An aperture shapes and sizes the light patch to nearly match the dimensions of one of the light sensors. The prism rotates with the shaft and refracts the light beam in proportion to the rotation angle. As the patch translates across the surface of the light sensors, more light impinges on one light sensor and correspondingly less light impinges on the other light sensor. The difference between the signals produced by the two light sensors produces an output signal that approximates the angular displacement of the shaft from a null position. The distance through which the light patch translates depends the on angular displacement of the prism and is immune to radial or axial translation of the prism.

9 Claims, 4 Drawing Sheets

ELECTRO-OPTICAL SHAFT ANGLE TRANSDUCER HAVING A ROTATABLE REFRACTIVE OPTICAL ELEMENT

FIELD OF THE INVENTION

The present invention relates to a shaft angle transducer, and in particular to an angle transducer that uses a deflected beam of light when measuring the angle of rotation of a shaft.

BACKGROUND OF THE INVENTION

Instruments such as high-performance optical scanning galvanometers require accurate, fast-acting angle transducers. Designers have used light beams and light sensors to reduce the size, cost and inertia of prior art angle transducers. No prior art transducer exhibits all these desirable characteristics together with linear response, very low mass and insensitivity to mechanical and thermal disturbances.

One prior art transducer includes a light source mounted to rotate with a shaft. The light source directs a beam of light radially away from the shaft toward a pair of light sensors and the relative electrical output of the sensors is a measure of the angular displacement of the shaft. The shaft-mounted light source and its flexing wires pose problems when they are used in high-frequency scanner applications, however, because they disturb the shaft's mass balance, create parasitic resonances and fatigue and ultimately break the wires.

Some other prior art transducers include a baffle or set of vanes mounted to a shaft. A fixed light source shines a beam of light through the baffle or vanes onto fixed light sensors. As the shaft rotates, the baffle or set of vanes modulates the light reaching the sensors. These designs pose problems because the output signal is not linear with the angle of rotation.

Another prior art transducer uses a semicircular baffle to produce a semicircular patch of light on two semicircular light sensors. The baffle, and consequently the light patch, rotate with the shaft. The relative amounts of light impinging on the two light sensors produce an output signal that approximates the angle of the shaft's rotation. This design poses problems, however, because the transducer is expensive and the baffle is not symmetric about the axis of rotation and, therefore, disturbs the shaft's mass balance.

Problematically, these prior art transducers also exhibit a low signal-to-noise ratio.

It is, therefore, an object of the present invention to provide a shaft angle transducer having a linear response, high signal-to-noise ratio, small size and low cost.

It is a further objective to provide a transducer that imposes a minimum of mass and mass imbalance upon the shaft.

It is a yet further objective to provide a transducer that is insensitive to vibration and radial or axial translation of the shaft.

Other objectives will, in part, be obvious and will, in part, appear hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts which are adapted to effect such steps, all as exemplified in the following detailed description, and the scope of the invention will be indicated in the claims.

SUMMARY OF THE INVENTION

The present invention utilizes a rectangular prism, or other suitable refractive element, that is fixed to a shaft for rotation with the shaft to refract (bend) a beam of light and thereby translate (move in one dimension) a patch of light across the surface of a pair of light sensors. As the light patch translates, more light impinges on one light sensor and correspondingly less light impinges on the other light sensor. The difference between the amount of light impinging on the two light sensors and therefore the difference between the signals proceeds by the light sensors is substantially linearly related to the angular displacement of the shaft.

Advantageously, the symmetrical prism adds only a small amount of mass and no imbalance to the shaft. In addition, in applications such as optical scanners, which typically involve shaft angle excursions of up to one radian (approximately 57 degrees), a suitable prism provides a nearly linear response.

Several aspects of the invention enable it to efficiently use the area of the light sensors, thereby achieving a higher signal-to-noise ratio than prior art shaft angle transducers. The strength of a signal produced by a light sensor is proportional to the area of the light sensor that is illuminated and the intensity of the illuminating light patch. The noise in the signal is proportional to the product of the total sensing area, the square root of the absolute temperature of the sensor and the electrical resistance of the sensor.

In the transducer described herein, a cylindrical lens focuses the light beam on the sensors, thereby increasing the intensity of the light patch. An aperture shapes and sizes the light patch to nearly match the dimensions of one of the light sensors, thereby maximizing the area of the sensor that is illuminated. The present transducer also employs a broad baffle that eliminates stray light and its associated noise.

Advantageously, the transducer is also insensitive to vibration. The position of the light patch on the light sensors depends on the angular displacement of the prism and not on the lateral or longitudinal position of the prism. The transducer is, therefore, insensitive to imperfections in the shaft's bearings and external vibration that cause radial or axial translations of the prism.

BRIEF DESCRIPTION OF THE DRAWINGS

The above and further advantages of the invention may be better understood by referring to the following detailed description in conjunction with the accompanying drawings in which.

DETAILED DESCRIPTION OF THE PREFERRED EMBODIMENT

Figure 1:
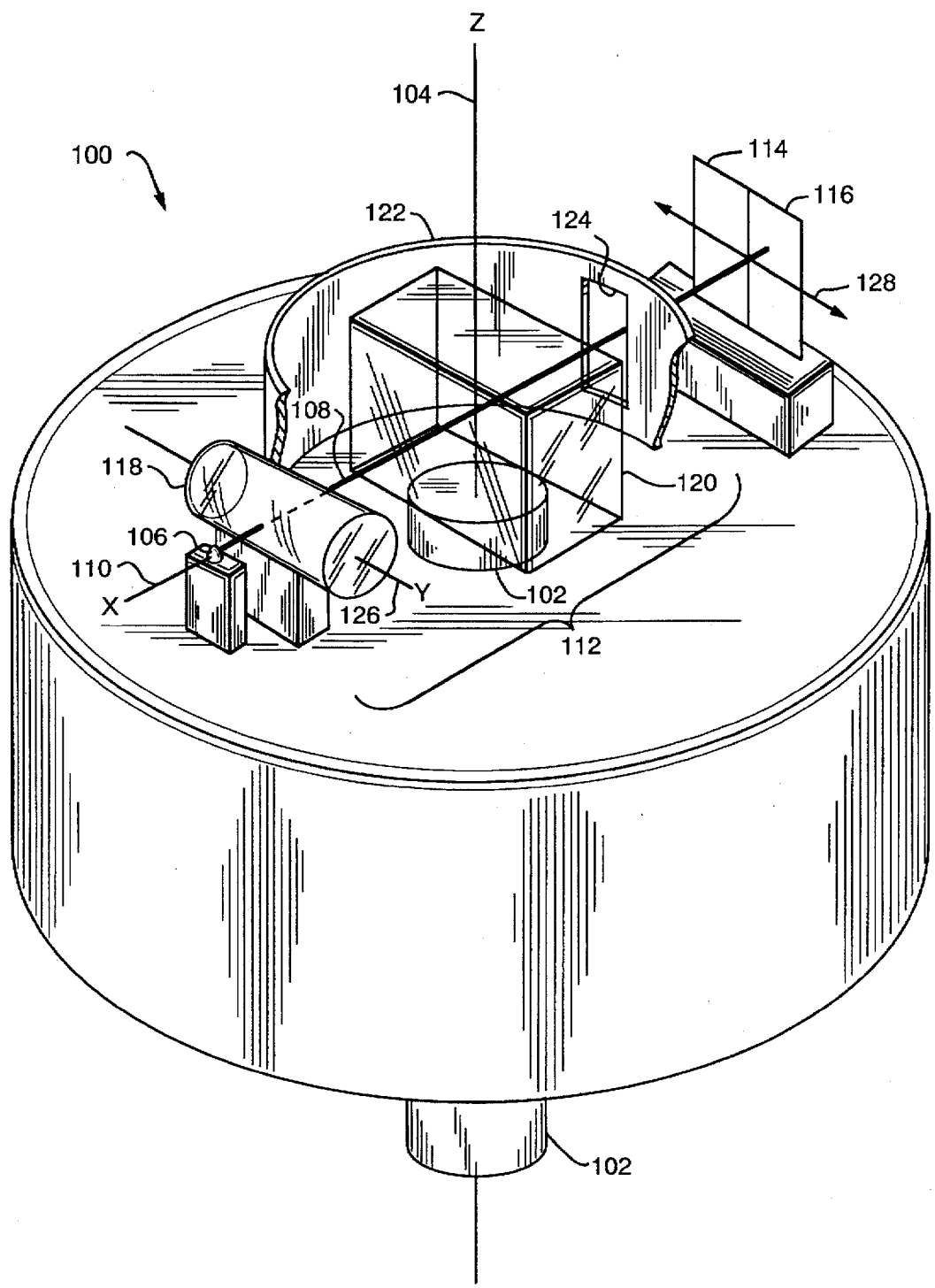
FIG. 1 is a perspective view of the shaft angle transducer with part of the baffle removed for clarity.

FIG. 1 shows generally at 100 a shaft angle transducer coupled to a shaft 102 to measure the angular displacement of the shaft about a Z-axis of rotation 104. A light emitting diode (LED) 106 projects a beam of light 108 along an X-axis 110, through an optical assembly 112, onto two light sensors 114 and 116. The X-axis 110 is substantially perpendicular to the Z-axis 104 and it passes between the light sensors 114 and 116. The optical assembly 112 consists of a cylindrical lens 118 that focuses the light beam 108 onto the light sensors 114 and 116; a rectangular prism 120 that is fixed to the shaft 102 for rotation therewith; and a baffle 122 having an aperture 124. Part of the baffle 122 is not shown in FIG. 1 for clarity. The cylindrical lens 118 has a Y-axis 126 substantially perpendicular to the X-axis 110 and the Z-axis 104. The light beam 108 passes through the prism 120, the aperture 124 and then impinges on the two light sensors 114 and 116. Preferably, the two light sensors 114 and 116 are constructed on a common substrate, commonly called a "bi-cell" or "split cell" photodetector. The light sensitivity of light sensors varies with temperature, however this construction minimizes the temperature difference between the two light sensors, thus minimizing the deleterious effects of a temperature differential between the two sensors. An electrical circuit (not shown) produces an output signal from the difference between the signals produced by the light sensors 114 and 116.

Figure 2:
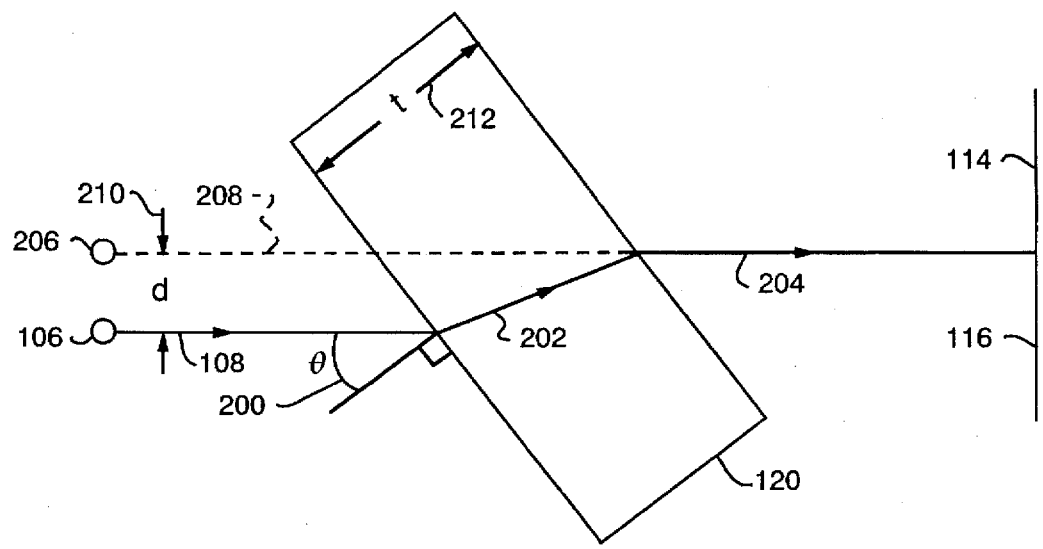
FIG. 2 illustrates a path taken by a light beam refracted by the rotated prism in the shaft angle transducer and the resulting apparent displacement of a light source.

FIG. 2 illustrates the light beam 108 being refracted by the prism 120. The LED 106 produces the light beam 108, which impinges on the prism 120 at an angle θ200. Since the prism 120 is attached for rotation with the shaft 102 (FIG. 1), angle θ200 is also the angle of rotation of the shaft 102. The light beam 108 is refracted upon entering the prism 120. The refracted beam 202 is once again refracted upon exiting the prism 120. The subsequently-refracted beam 204 is parallel to the light beam 108 because the prism 120 has parallel sides. From the perspective of the light sensors 114 and 116, the subsequently-refracted beam 204 has an apparent source 206 and an apparent path 208. The displacement of the apparent light source 206 from the LED 106 is indicated as "d" 210. Note that as angle θ200 increases, displacement "d" 210 also increases. The thickness of the prism 120 is indicated as "t" 212. As is well known in the art, the relationship between displacement "d" 210 and angle θ200 is represented by:

$$d = \{\sin(\theta-\beta)/\cos(\beta)\}t,$$

where:

$$\beta = \arcsin\{\sin(\theta)/n\},$$

t=thickness of prism 120 and n=index of refraction of prism 120.

Figure 3:
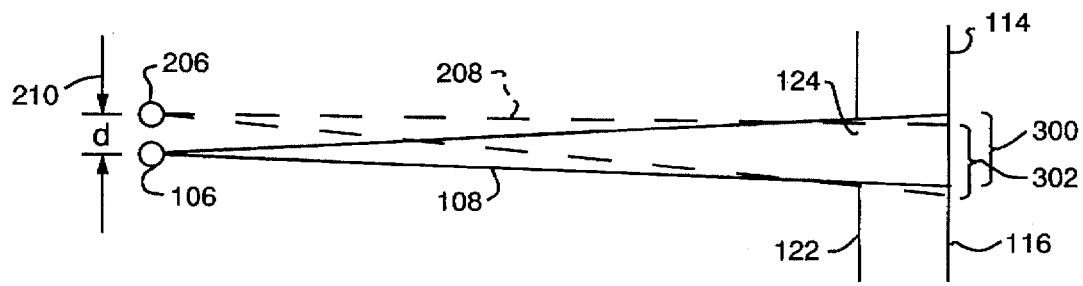
FIG. 3 illustrates the displacement of a light patch on two light sensors as a result of the apparent displacement of the light source.

As can be seen in FIG. 3, the LED 106 directs the light beam 108 through the aperture 124 in the baffle 122 onto the light sensors 114 and 116 and produces a patch of light, indicated at 300, impinging on the light sensors. As the prism 120 rotates, it displaces the apparent location of the light source (FIG. 2) along a patch-movement axis 128 (FIG. 1) parallel to the Y-axis 126 of the cylindrical lens 118. The aperture 124 and the displacement of the apparent light source combine to displace the patch of light impinging on the light sensors 114 and 116. From the perspective of the light sensors 114 and 116, the apparent light source 206 produces a beam that follows an apparent light path 208, through the aperture 124, and produces a displaced patch of light, indicated at 302, on the sensors.

Figure 4:
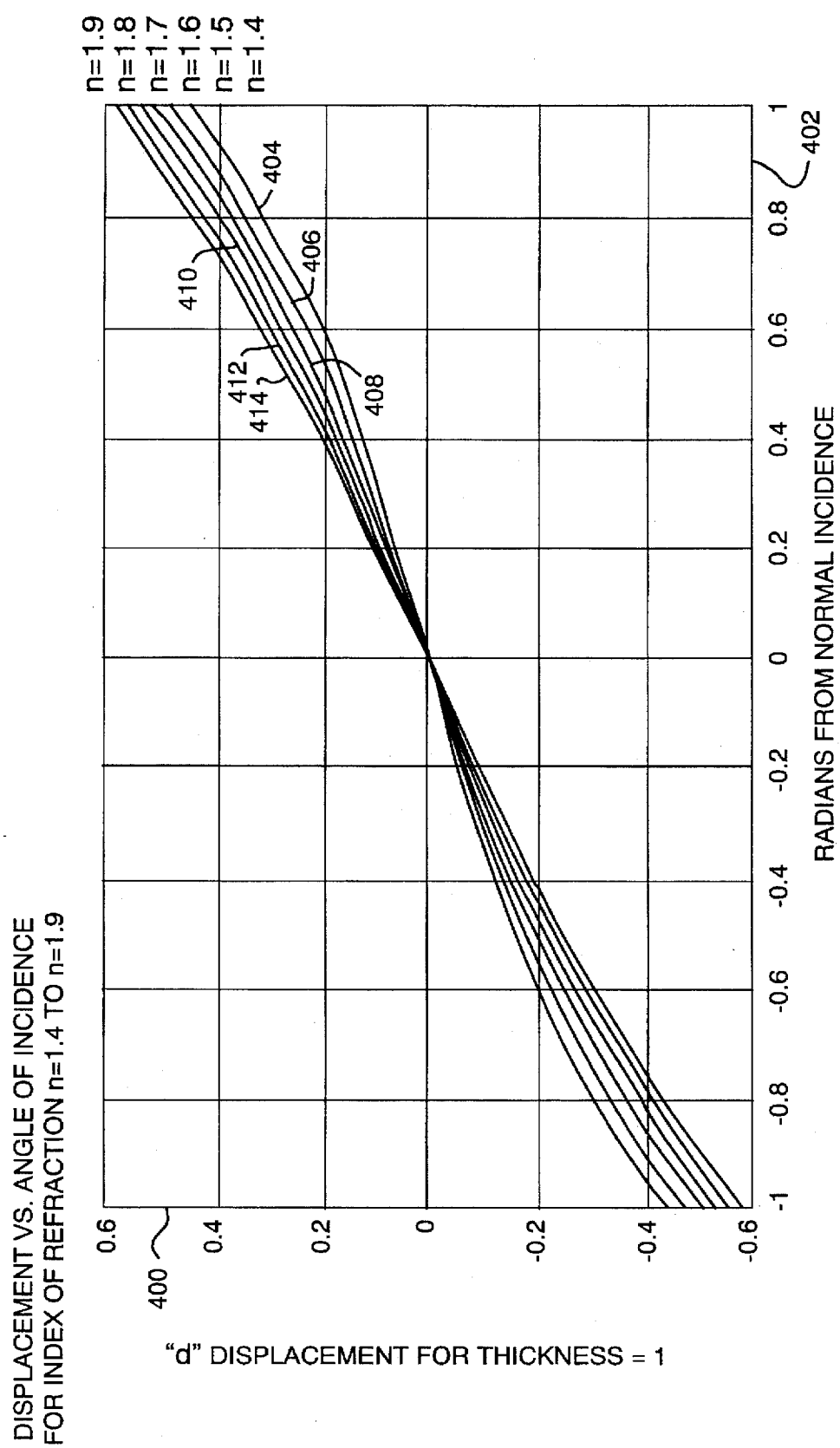
FIG. 4 is a graph of the displacement of the apparent light source plotted against the rotation angle of the prism.

The graph in FIG. 4 shows apparent displacements "d" 210 (plotted along the Y-axis 400) of the light source 206 as a result of rotating the prism 120 through angles (plotted along the X-axis 402) of between −1.0 and +1.0 radians (approximately −57.3 to +57.3 degrees) from a null position. Each line 404–414 in the graph represents an exemplary prism having a different index of refraction "n." In applications, such as optical scanners, shaft rotation angles of interest are typically in a region within 0.5 radians (approximately 28.6 degrees) of a null position. As can be seen from FIG. 4, a higher index of refraction results in better linearity in the region of interest. Glass, many common transparent plastics and other materials have indices of refraction that produce satisfactorily linear results.

Angular displacements of the shaft produce relatively small translations of the light patch, effectively providing a "gear reduction." Advantageously, this reduction permits using smaller, less expensive light sensors and facilitates measuring relatively large angular displacements. "Gain" hereinafter refers to the ratio of light patch translation to shaft rotation angle. As the lines 404–414 in the graph in FIG. 4 indicate, gain depends on the index of refraction of the prism 120. (Gain also depends on the location of the aperture relative to the LED and light sensors, as described below.)

An ideal light source for the transducer is a point source because a point source casts sharp shadows, whereas an extended light source does not generally cast sufficiently sharp shadows. A small, high-intensity, non-Lambertian light source approaches this ideal. (A Lambert light source radiates from its surface in all directions and the observed intensity of a ray varies as the cosine of the angle between the ray and a normal to the surface.) For example, a laser diode having a radiating surface of approximately 5×100 microns would provide sufficiently sharp shadows. The radiating surface of a laser diode is generally rectangular and its light beam is concentrated along the long dimension of the radiating surface, thus the beam has a generally elliptical cross-section, the minor axis of the ellipse being parallel to the long dimension of the radiating surface. If a laser diode is used as the light source, preferably it should be oriented with the long dimension of the radiating surface parallel to the axis of rotation 104 of the prism to minimize the apparent size of the light source and hence the penumbra cast on the light sensors along the patch-movement axis. (The size of the penumbra is proportional to the size of the light source and the aperture-to-sensor distance.) If the light source is sufficiently small, intense and non-Lambertian, the cylindrical lens 118 can be eliminated while still achieving the desired intensity of the light patch and signal-to-noise ratio. Although an LED is not a point source, the preferred embodiment employs, an unlensed LED having a diameter of approximately 200 microns because of its low cost. An LED produces a light patch with uniform intensity near its center, however, the intensity decreases at the edges of the patch because the aperture and the finite width of the LED create a penumbra. Alternatively, the separate LED 106 and cylindrical lens 118 can be combined into an LED having a cylindrical lens molded into its package. Alternatively, the light source can be remote from the other components of the transducer and the light can be delivered via an optical conduit, such as a fiber optic bundle.

In the preferred embodiment, the cylindrical lens 118 shapes the diverging light beam 108, which in the case of an LED is a substantially conical beam, into an approximate wedge of light. Most unlensed sources radiate over a relatively large angle, hence without the cylindrical lens 118, only a small part of the energy from the LED 106 would impinge on the sensors. The cylindrical lens 118 yields approximately an eight-fold increase in the intensity of the beam impinging on the light sensors 114 and 116 without increasing the apparent size of the light source and, therefore, without increasing the size of the penumbra. The cylindrical lens 118 only focuses light along the Z-axis 104. It is therefore important that the cylindrical lens 118 be oriented so its Y-axis 126 is substantially perpendicular to the beam 108 and the Z-axis 104, but only moderate precision is required when positioning the lens. In the preferred embodiment, the cylindrical lens 118 is made of a standard-sized glass or plastic rod, ⅛ in. (3.18 mm) in diameter.

Two considerations influence the optimum amount of translation of the light patch across the light sensors 114 and 116. First, maximizing the translation maximizes the gain, resolution and angular range of the transducer. Second, limiting the translation so the light patch does not "spill" over an edge of a light sensor and a penumbra does not translate from one light sensor to the other light sensor preserves the linearity of the output signal. Preferably, the aperture 124 is located close to the sensors 114 and 116 to minimize the width of the penumbra and allow for greater patch translation.

The displacement of the light patch is proportional to the angular displacement of the shaft 102. As can be seen from FIG. 3, the proportion depends on a ratio of two distances: the distance between the aperture 124 and the light sensors 114 and 116 and the distance between the LED 106 and the aperture 124. A higher ratio produces a greater displacement, i.e. a higher gain. The ratio of the two distances depends primarily on whether the aperture 124 is placed between the LED 106 and the prism 120 or between the prism 120 and the light sensors 114 and 116. The aperture 124 is preferably placed between the prism 120 and the light sensors 114 and 116 to minimize the width of the penumbra. The placement of the aperture 124 relative to the light sensors 114 and 116 does not affect the amount of light reaching the sensors and, thus, does not impact either the signal strength or noise level. Minimizing the spacing between the LED 106 and the light sensors 114 and 116 maximizes the intensity of the light beam impinging on the sensors and, thus, increases the signal strength.

Sufficient space must remain, however, between the LED 106 and the light sensors 114 and 116 to accommodate the cylindrical lens 118, the baffle 122 and the prism 120 at the extremes of its rotation. In the preferred embodiment, the transducer is 25 mm in diameter. Supporting structures for the LED 106 and the light sensors 114 and 116 take up 10.5 mm, leaving 14.5 mm between the LED and the light sensors. The distance between the LED 106 and the aperture 124 is 10.0 mm to accommodate the cylindrical lens 118 (⅛ inch or 3.18 mm), its back focal length (0.0–0.6 mm) and the rotating prism 120 (including a safety margin). The distance between the aperture 124 and the light sensors 114 and 116 is the remaining 14.5−10.0=4.5 mm. The optical distance between the LED 106 and the aperture 124 is 9.0 mm, however, due to the prism 120. The ratio of the optical distances between the LED 106 and the aperture 124 and between the aperture 124 and the light sensors 114 and 116 is 9.0:4.5=2:1. Consequently, a displacement of the apparent light source 206 causes the light patch to displace exactly one-half as far and the penumbra is one-half as wide as the LED 106.

Figure 5A:
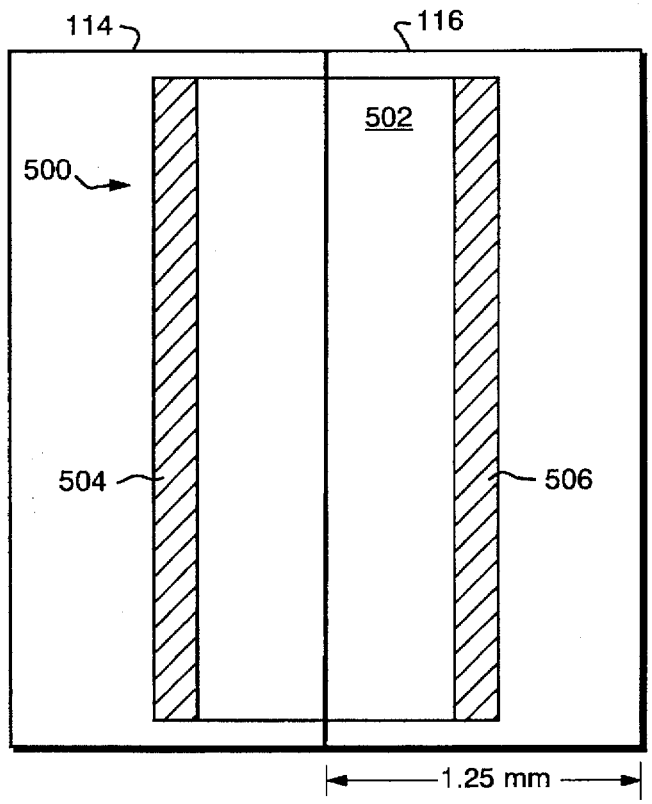
FIGS. 5A and 5B illustrate a light patch centered on the two light sensors (FIG. 5A), and the light patch translated nearly to the edge of one of the light sensors (FIG. 5B).
Figure 5B:
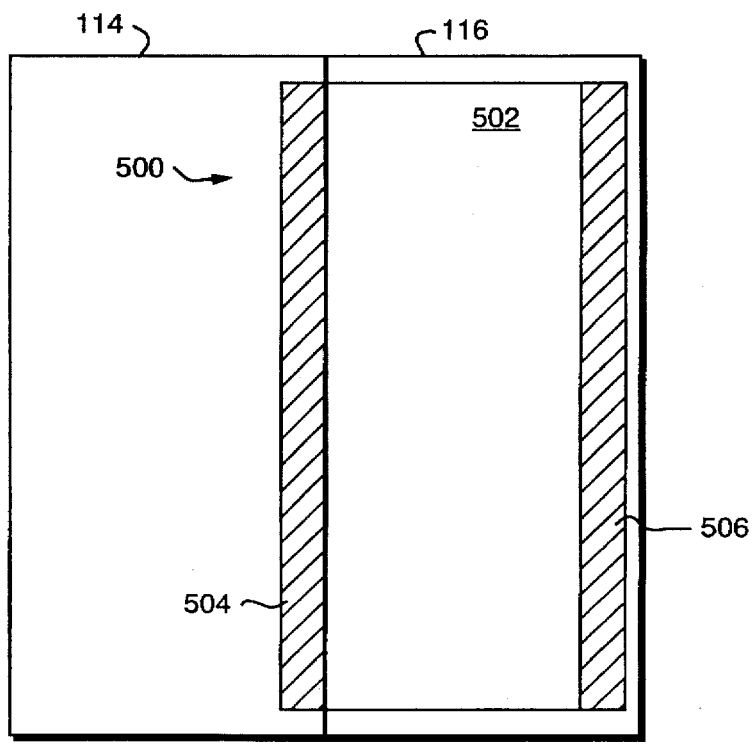

Each of the two light sensors 114 and 116 is 1.25 mm wide while the LED 106 is 0.2 mm wide. FIG. 5A shows a light patch 500 centered on the two light sensors 114 and 116. The light patch 500 includes a uniformly-lit portion 502 and two penumbras 504 and 506. Each penumbra is ½×0.2=0.1 mm wide. FIG. 5B shows the light patch 500 maximally translated without spilling over an edge of the light sensor 116 and without penumbra 504 translating from light sensor 114 to light sensor 116. The light patch 500 can be as large as the sum of the width of one light sensor and one penumbra, i.e. 1.25+0.1=1.35 mm. The uniformly-lit portion 502 is 1.15 mm wide, so the light patch 500 can translate a maximum of ½×1.15=0.575 mm in either direction without introducing non-linearities. The apparent light source 206 can translate a maximum of 2×0.575=1.15 mm in either direction. As can be seen from FIG. 4, a prism with an index of refraction of 1.6 displaces a light patch 0.2 mm per 1 mm of thickness at a shaft angle of 0.5 radians. The prism 120 is 3.18 mm thick, so it displaces the light patch 0.636 mm at 0.5 radians and 1.15 mm at 0.8 radians. These displacements accommodate the desired range of angular displacements and are less than the maximum displacement calculated above.

The size of uniformly-lit portion 502 depends on the size of the aperture 124 and the ratio of two distances: the distance between the aperture 124 and the light sensors 114 and 116 and the distance between the LED 106 and the light sensors. An aperture width of 1.15×⅔=0.767 mm produces a uniformly-lit portion that is 1.15 mm wide, as required by the calculations above.

The baffle 122 is mounted to allow its movement to facilitate "zeroing" the transducer at a null angle. Once the transducer is zeroed, the baffle 122 can be fixed in place, e.g. with an appropriate adhesive.

It will therefore be seen that I have developed a shaft angle transducer and method of measuring the angular displacements of a shaft, which can be utilized in a variety of applications. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A transducer for measuring angular displacement of an object, said transducer comprising:
    A. a radiation source producing a diverging beam of radiation,
    B. a radiation sensor, disposed in the path of said beam, said sensor producing an output signal that varies continuously in accordance with the movement of a patch of radiation thereon in a line perpendicular to the axis of said angular displacement,
    C. a refractive optical element disposed in said diverging beam between said source and said sensor, said element being attached to said object for rotation therewith, whereby rotation of the optical element translates said beam perpendicularly to said axis, and
    D. means forming an aperture intercepting said diverging beam between said optical element and said sensor, thereby to define the size of an illuminated patch on said sensor, said patch moving perpendicularly to said axis in response to angular displacement of said object.

2. The transducer defined in claim 1, wherein the radiation source comprises:

A. a light emitting diode producing a diverging beam of radiation; and

B. a cylindrical lens in the diverging beam, the axis of the lens being substantially perpendicular to the axis of angular displacement of the beam and substantially parallel to the direction of patch-movement, whereby the lens restricts extent of the beam produced by the radiation source in a direction substantially perpendicular to the patch-movement axis.

3. The transducer defined in claim 1, wherein the radiation sensor is bisected into two segments along an axis substantially perpendicular to the axis of angular displacement, whereby relative amounts of radiation impinging on each portion vary in accordance with movement of the patch.

4. The transducer defined in claim 3 in which:

A. said sensor segments are substantially identical in size and

B. the size of said patch in the direction of patch movement is substantially the width of one of said segments in that direction.

5. The transducer defined in claim 1 including a cylindrical lens,

A. disposed in the path of said beam and

B. whose axis is parallel to the direction of path movement, whereby said lens reduces the extent of said beam in the direction parallel to said axis of rotation.

6. The transducer defined in claim 1 in which the refractive element includes first and second parallel faces, said beam entering the element through said first face and exiting said element through said second face.

7. The transducer defined in claim 1 in which said radiation source is a laser diode.

8. The transducer defined in claim 1 in which said radiation source is a light emitting diode.

9. The transducer defined in claim 8 including a cylindrical lens,

A. disposed in the path of said beam; and

B. whose axis is parallel to the direction of patch movement, whereby said lens reduces the extent of said beam in the direction parallel to the axis of rotation.

* * * * *